United States Patent
Huelke et al.

(10) Patent No.: US 9,919,631 B2
(45) Date of Patent: Mar. 20, 2018

(54) ADJUSTABLE CUP HOLDER ASSEMBLY FOR A MOTOR VEHICLE DOOR

(71) Applicant: FORD GLOBAL TECHNOLOGIES, LLC, Dearborn, MI (US)

(72) Inventors: David Huelke, Milan, MI (US); Eric Axel Smitterberg, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 15/006,521

(22) Filed: Jan. 26, 2016

(65) Prior Publication Data
US 2017/0210265 A1 Jul. 27, 2017

(51) Int. Cl.
| | |
|---|---|
| *B60J 5/00* | (2006.01) |
| *B60N 3/10* | (2006.01) |
| *B60J 5/04* | (2006.01) |
| *B60R 11/00* | (2006.01) |

(52) U.S. Cl.
CPC ............ *B60N 3/102* (2013.01); *B60J 5/0493* (2013.01); *B60R 2011/0021* (2013.01)

(58) Field of Classification Search
CPC . B60N 3/102; B60J 5/0493; B60R 2011/0021
USPC ..................................................... 296/37.13
See application file for complete search history.

(56) References Cited

U.S. PATENT DOCUMENTS

| | | | |
|---|---|---|---|
| 4,511,072 A | 4/1985 | Owens | |
| 4,984,722 A | 1/1991 | Moore | |
| 5,180,089 A * | 1/1993 | Suman | B60N 2/4673 211/94.01 |
| 6,637,709 B1 | 10/2003 | Guenther et al. | |
| 7,537,258 B2 * | 5/2009 | Quijano | B60R 7/08 211/86.01 |
| 2005/0134074 A1* | 6/2005 | Youngs | B60R 7/081 296/37.13 |
| 2007/0145760 A1 | 6/2007 | Gresham et al. | |
| 2013/0168992 A1* | 7/2013 | Orlowsky | B60R 7/046 296/37.13 |
| 2015/0115650 A1 | 4/2015 | Zhang et al. | |

FOREIGN PATENT DOCUMENTS

EP        1752333 B1     10/2009

OTHER PUBLICATIONS

English machine translation of EP1752333B1.

* cited by examiner

*Primary Examiner* — Joseph D. Pape
(74) *Attorney, Agent, or Firm* — Vichit Chea; King & Schickli, PLLC

(57) ABSTRACT

An adjustable cup holder assembly is provided. That adjustable cup holder assembly includes a support having a guide track and a drag bar. The adjustable cup holder also includes a cup holder having (a) a body including a well, (b) an actuator and (c) a drag. The cup holder may be displaced along the guide track and secured in various positions on the support by engaging the drag bar. A motor vehicle door including a cup holder with an adjustment mechanism for displacing the cup holder along the body of the door between multiple positions is also disclosed.

12 Claims, 5 Drawing Sheets

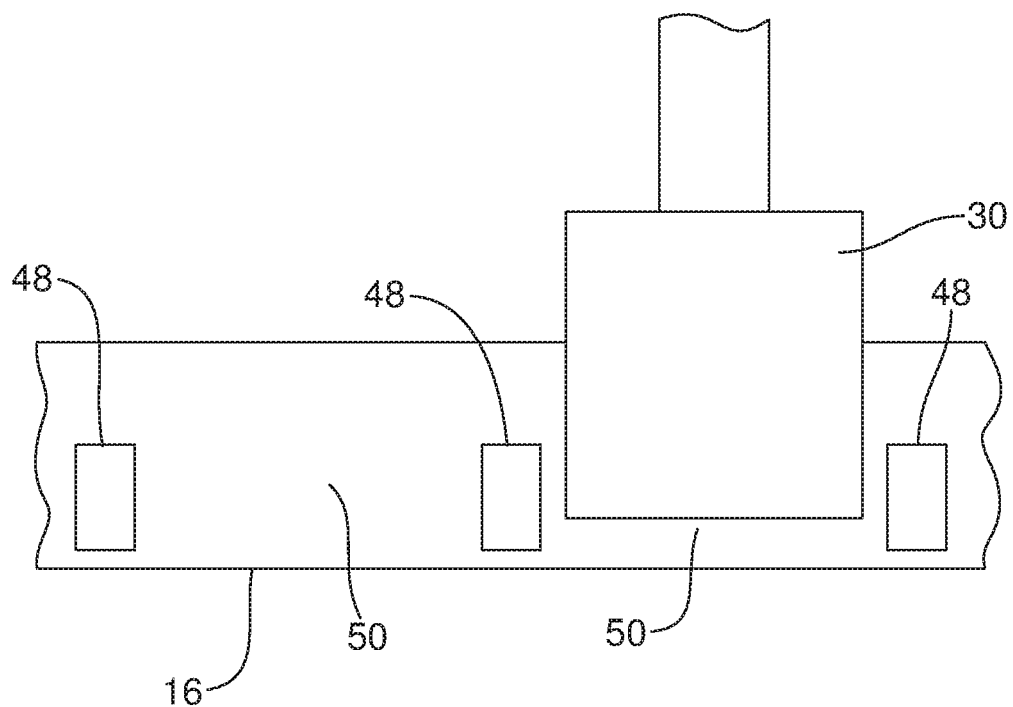

ADJUSTABLE CUP HOLDER ASSEMBLY FOR A MOTOR VEHICLE DOOR

TECHNICAL FIELD

This document relates generally to the motor vehicle equipment field and, more particularly, to an adjustable cup holder assembly for a motor vehicle door that allows for fore and aft adjustment of the cup holder in the map pocket at the bottom of the door.

BACKGROUND

In the past, motor vehicle doors have been provided that incorporate a map pocket including a stationary, molded in place cup holder. See FIG. 1 illustrating the motor vehicle door D, the map pocket M and the stationary cup holder C.

Motor vehicle drivers come in all shapes and sizes. In order to properly operate a motor vehicle, shorter drivers typically adjust the driver's seat and set it in a forward position closer to the steering wheel and the motor vehicle control pedals. In contrast, taller drivers typically adjust and set the driver's seat in a rearward position further from the steering wheel and the motor vehicle control pedals. As should be appreciated, a stationary cup holder C in the map pocket M of a door D as illustrated in FIG. 1 will not adjust to the driver or the driver's seating position. Accordingly, the cup holder C may be inconveniently located and even difficult to reach for certain drivers.

This document relates to a new and improved adjustable cup holder assembly that is provided in the map pocket of a motor vehicle door. That adjustable cup holder provides for adjustment in a fore and aft direction (that is: in a vehicle forward and rearward direction) within the map pocket so as to be more conveniently located for a vehicle operator.

SUMMARY

In accordance with the purposes and benefits described herein, an adjustable cup holder assembly is provided. That adjustable cup holder assembly comprises a support, including a guide track and a drag bar, and a cup holder. The cup holder includes (a) a body, having a cup well, (b) an actuator and (c) a drag. The cup holder may be displaced along the guide track and secured in various positions on the support by engaging the drag with the drag bar.

In one possible embodiment, the guide track includes two opposed channels and the cup holder spans a cavity in the support between the two opposed channels.

In one possible embodiment, the actuator includes a lever arm that pivots about a pivot carried on the body. Further, a spring may be provided that biases the lever arm into a locking position. An end of lever arm is connected by a drag link to the drag.

In one possible embodiment, the drag is u-shaped. Further, the drag bar may include a series of spaced ribs. In such an embodiment, the drag engages and holds the drag bar in spaces defined between the spaced ribs thereby allowing the cup holder to be secured in various, selected positions. In one particularly useful embodiment, the support is a map pocket of a motor vehicle door.

In accordance with an additional aspect, a motor vehicle door is provided. That motor vehicle door comprises a body, a cup holder carried on the body and an adjustment mechanism displacing the cup holder along the body between multiple positions.

In one possible embodiment, the body includes an elongated guide track and the cup holder is displaceable along that guide track. Further, the adjustment mechanism may include a drag bar on the body and a drag on the cup holder whereby the cup holder may be secured in any of the multiple positions.

In at least one embodiment the cup holder may further include an actuator for releasing the drag from the drag bar to displace the cup holder between the multiple positions. Further, the cup holder may include a spring for biasing the drag into engagement with the drag bar whereby the cup holder may be secured in any of the multiple positions when not being displaced between positions by the user.

In one particularly useful embodiment, the body includes a map pocket having a first sidewall and a second sidewall. Further, the body includes a guide track comprising a first channel in the first sidewall and a second channel in the second sidewall. The first channel may be opposed to the second channel and the cup holder may include opposed elements that ride along the opposed first and second channels. In such an embodiment, the adjustment mechanism may include a drag bar on the body and a drag on the cup holder to secure the cup holder in any of the multiple positions. Further, the cup holder may include an actuator for releasing the drag from the drag bar to displace the cup holder between the multiple positions. In addition, a spring may be provided for biasing the drag into engagement with the drag bar when it is not being displaced between positions.

Still further, in accordance with yet another aspect, a method is provided for improving cup holder accessibility for a motor vehicle occupant. That method comprises providing a cup holder in a motor vehicle door wherein the cup holder has fore-aft adjustability and may be positioned for easier access by a user.

In the following description, there are shown and described several preferred embodiments of the adjustable cup holder assembly as well as the motor vehicle door incorporating the adjustable cup holder. As it should be realized, the cup holder assembly and the door are capable of other, different embodiments and their several details are capable of modification in various, obvious aspects all without departing from the cup holder assembly and door as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the adjustable cup holder assembly and the motor vehicle door and together with the description serve to explain certain principles thereof. In the drawing figures:

FIG. 5 is a detailed side elevational view of one possible embodiment of drag bar that may be utilized in the cup holder assembly illustrated in FIGS. 2-4.

Reference will now be made in detail to the present preferred embodiments of the adjustable cup holder and motor vehicle door, examples of which are illustrated in the accompanying drawing figures.

DETAILED DESCRIPTION

Figure 1:
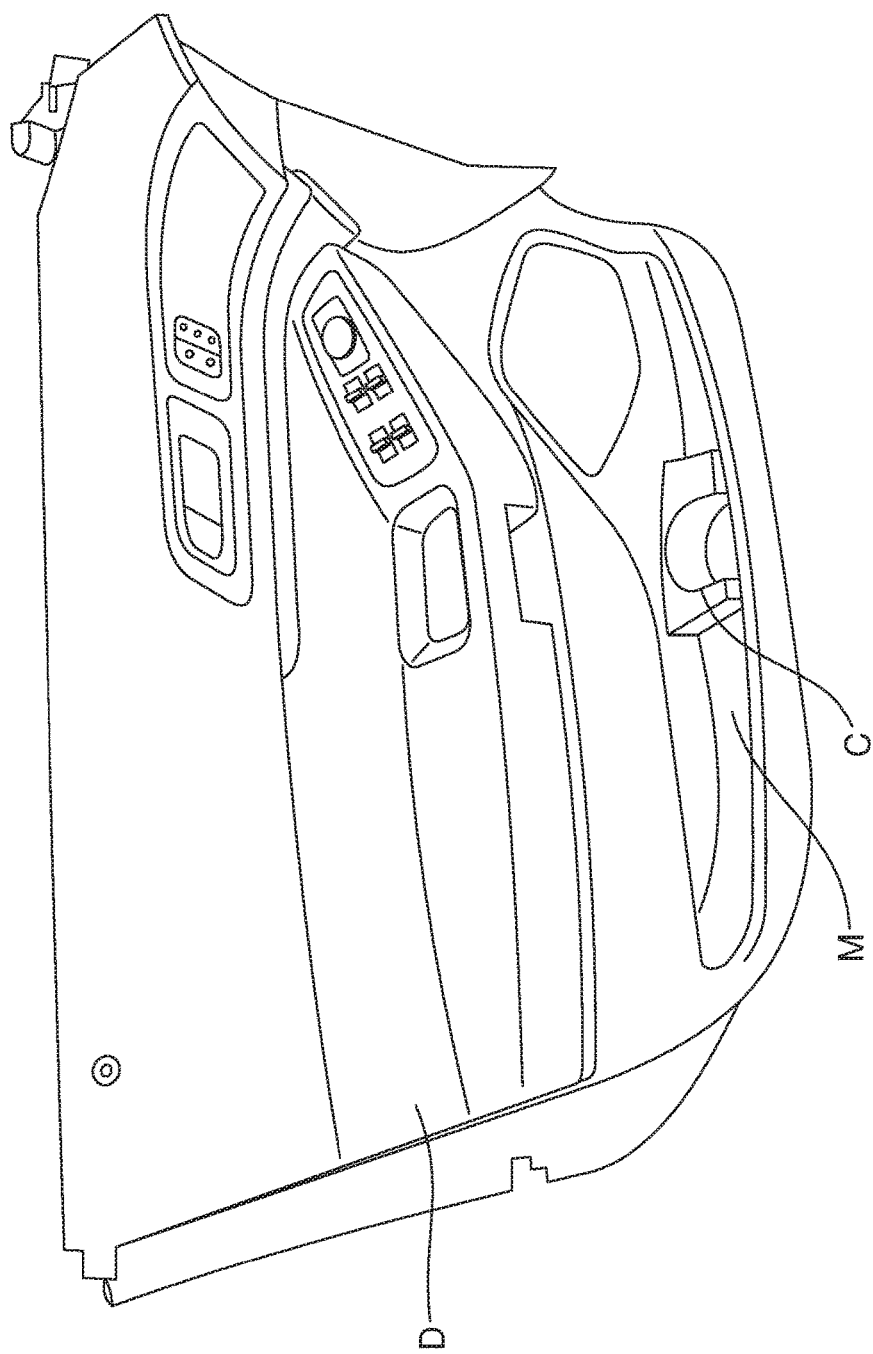
FIG. 1 is a perspective side view of a prior art motor vehicle door incorporating a stationary, molded-in-place cup holder in the map pocket of the door.
Figure 2:
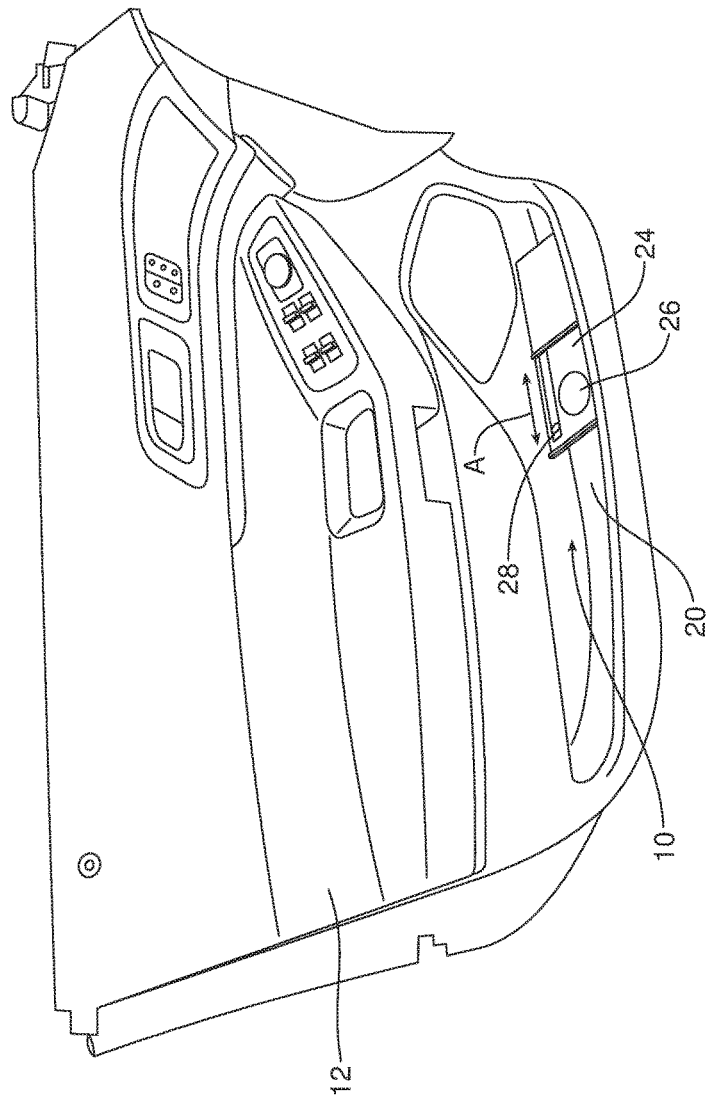
FIG. 2 is a view similar to FIG. 1 but illustrating a motor vehicle door incorporating an adjustable cup holder assembly as set forth and described in this document.
Figure 3:
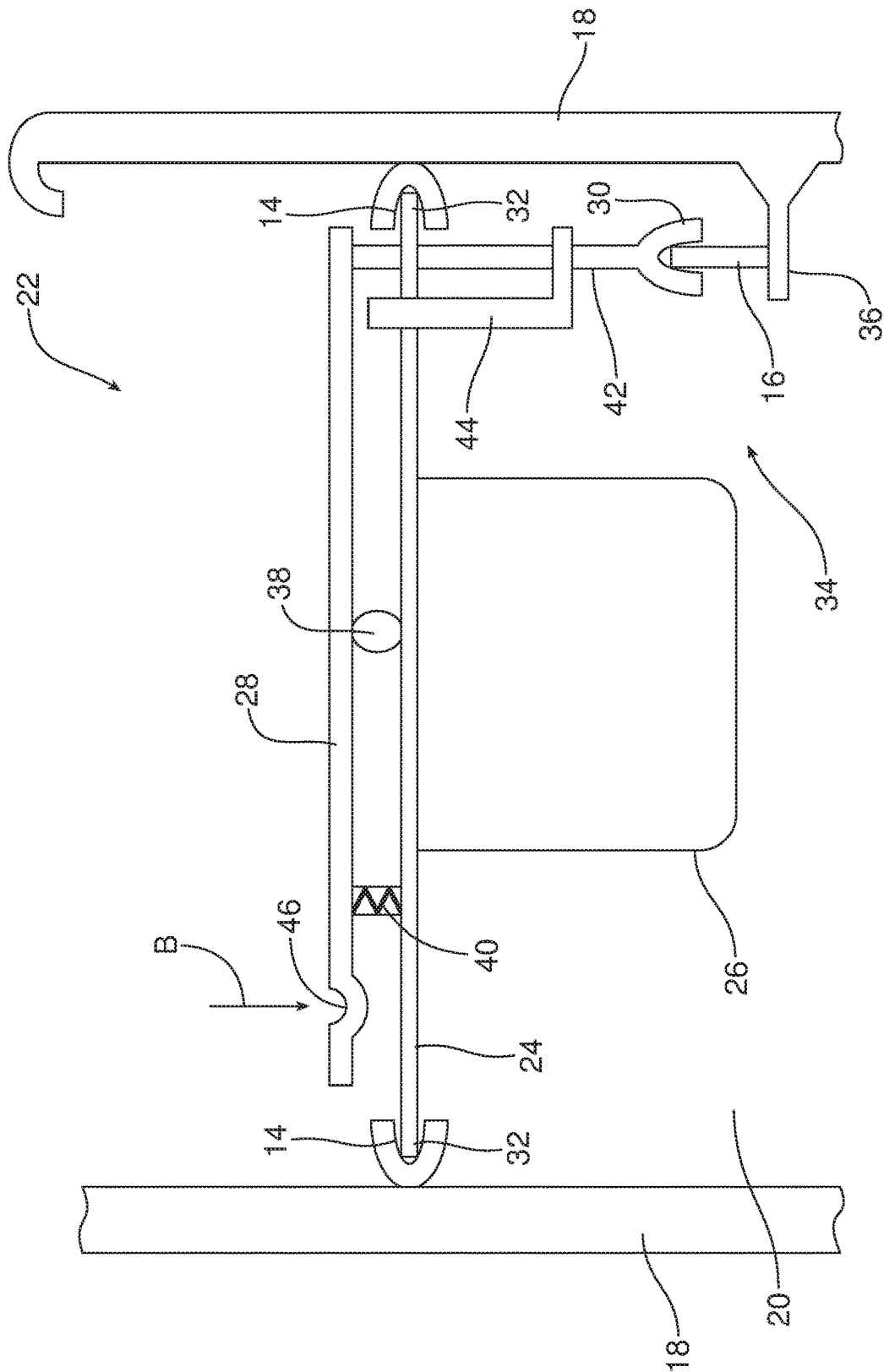
FIG. 3 is a schematic transverse cross-sectional view of the adjustable cup holder assembly.
Figure 4:
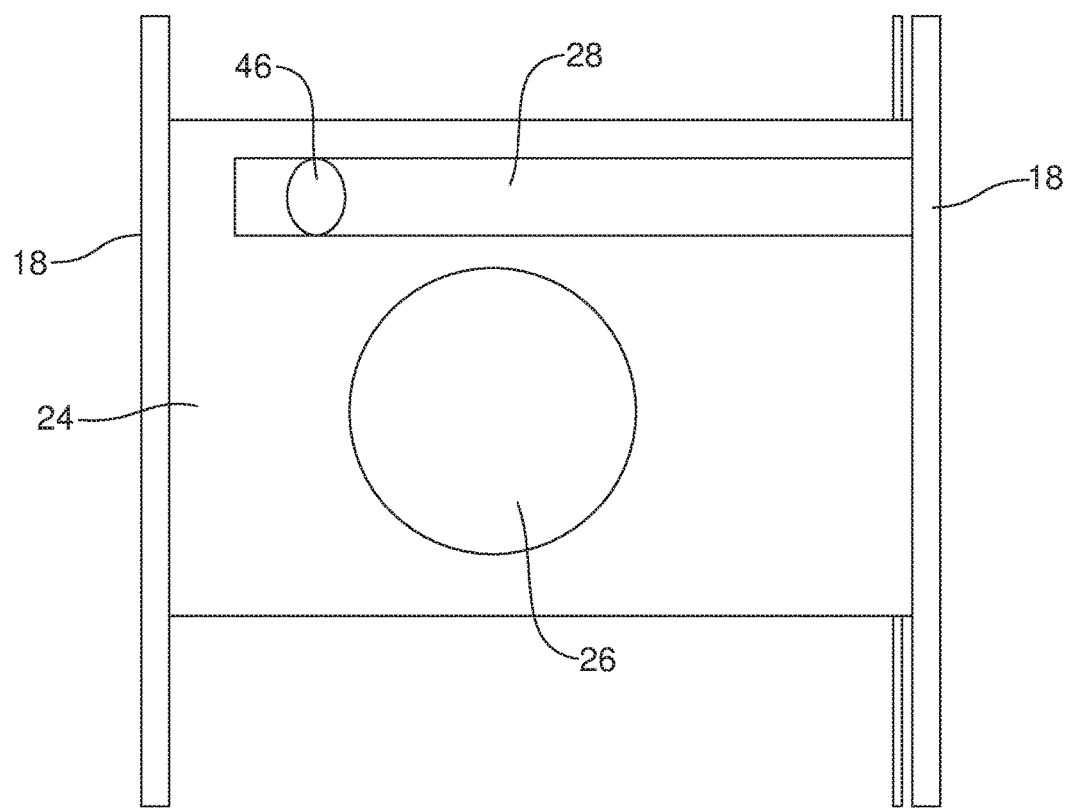
FIG. 4 is a detailed schematical top plane view of the adjustable cup holder assembly illustrated in FIG. 3.

Reference is now made to FIGS. 2-4 illustrating the adjustable cup holder assembly 10. As illustrated, the adjustable cup holder assembly 10 includes a support 12. The support 12 includes a guide track 14 and a drag bar 16. More specifically, in the illustrated embodiment the support 12 comprises a motor vehicle door and the guide track 14 comprises opposed first and second channels provided in the sidewalls 18 of a map pocket 20 provided along the bottom margin of the support/door 12.

As further illustrated in drawing FIGS. 2-4, the adjustable cup holder assembly 10 also includes a cup holder generally designated by reference numeral 22. More specifically, the cup holder 22 includes a body 24 having a well 26 for holding a cup or bottle, an actuator 28 and a drag 30. As will be apparent from the following description, the cup holder 22 may be displaced along the guide track 14 in the sidewalls 18 of the map pocket 20 and moved in a fore or aft direction (note action arrow A in FIG. 2) as desired. The cup holder 22 may then be secured in any of various possible positions on the support or door 12 by engaging the drag 30 with the drag bar 16. As clearly illustrated in FIGS. 2 and 3, the cup holder 22 and more specifically, the body 24 includes two opposed follower elements 32 that are received in and ride along the opposed guide track channels 14 as the cup holder is moved between positions. Thus it should be appreciated that the body 24 of the cup holder 22 spans the cavity of the map pocket 20.

FIGS. 3 and 4 show the adjustment mechanism 34 of the adjustable cup holder assembly 10. That adjustment mechanism 34 includes the drag bar 16 that is provided on the body 36 of the support/door 12 and the drag 30 that is carried on the cup holder 22. The drag 30 is u-shaped and fits over and partially around the drag bar 16 when the cup holder 22 is locked in place.

As further illustrated, the adjustment mechanism 34 also includes the actuator 28 for lifting and releasing the drag 30 from the drag bar 16 to displace the cup holder 22 between various positions along the elongated guide track 14 in the map pocket 20. In the illustrated embodiment, the actuator 28 comprises a lever arm that pivots about a pivot 38 carried on the body 24. A spring 40 provided between the body 24 and one end of the actuator/lever arm 28 biases the drag 30 into a lowered, locking position. As should be appreciated, the opposite end of the actuator/lever arm 28 is connected by a drag link 42 to the drag 30. A lug 44 may depend from the body 24 and support the drag link 42.

When one wishes to adjust the position of the cup holder 22 along the guide track 14 within the map pocket 20, one depresses the actuator/lever arm 28 at the finger depression point 46 (note action arrow B) against the force of the biasing spring 40 thereby causing the lever arm to pivot about the pivot 38 and raise the drag 30 from engagement with the drag bar 16. The individual may then slide the cup holder 22 along the guide track 14 in either a fore or aft direction within the map pocket 20 (note action arrow A in FIG. 2) until the cup holder is in the desired position. At that point the individual releases engagement with the actuator/lever arm 28. The spring 40 then biases the actuator/lever arm 28 back to its home position so that the drag 30 is once again brought down into contact with the drag link 42 with that engagement securing the cup holder 22 in the newly selected position within the map pocket 20.

In one possible embodiment illustrated in detail in FIG. 5, the drag bar 16 includes a series of spaced ribs 48. As illustrated, the drag 30 engages the drag bar 16 at the spaces 50 between the ribs 48 with the ribs preventing the cup holder 22 from sliding inadvertently in either a fore or aft direction with respect to the support or door 12 in the map pocket 20. Consistent with the above description, a method is also provided for improving cup holder accessibility for a motor vehicle occupant. That method includes providing a cup holder assembly 10 in a motor vehicle door 12. That cup holder 22 provides fore-aft adjustability and may be positioned for easier access by the user. The cup holder 22 may also be positioned in the map pocket 20 as desired to adjust the storage configuration of the map pocket. Thus, for example, the cup holder 22 may be moved to a full forward or full rearward position to allow for long article storage in the map pocket 20.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle door, comprising:
a body including an elongated guide track;
a cup holder displaceable along said guide track; and
an adjustment mechanism for displacing said cup holder along said guide track between multiple positions, said adjustment mechanism including a drag bar on said body, a drag on said cup holder and an actuator for releasing said drag from said drag bar to displace said cup holder between said multiple positions.

2. The motor vehicle door of claim 1, wherein said cup holder further includes a spring for biasing said drag into engagement with said drag bar whereby said cup holder may be secured in any of said multiple positions.

3. The motor vehicle door of claim 1, wherein said body includes a map pocket having a first sidewall and a second sidewall.

4. The motor vehicle door of claim 3, wherein said body includes a guide track comprising a first channel in said first sidewall and a second channel in said second sidewall.

5. The motor vehicle door of claim 4, wherein said first channel is opposed to said second channel and said cup holder includes opposed elements that ride along said first channel and said second channel.

6. The motor vehicle door of claim 5, wherein said adjustment mechanism includes a drag bar on said body and a drag on said cup holder whereby said cup holder may be secured in any of said multiple positions.

7. The motor vehicle door of claim 6, wherein said cup holder further includes an actuator for releasing said drag from said drag bar to displace said cup holder between said multiple positions.

8. The motor vehicle door of claim 7, wherein said cup holder further includes a spring for biasing said drag into engagement with said drag bar whereby said cup holder may be secured in any of said multiple positions.

9. A motor vehicle door, comprising:
   a body including a map pocket having a first sidewall, a second sidewall and a guide track comprising a first channel in said first sidewall and a second channel in said second sidewall;
   a cup holder carried on said body; and
   an adjustment mechanism for displacing said cup holder along said body between multiple positions wherein said first channel is opposed to said second channel and said cup holder includes opposed elements that ride along said first channel and said second channel.

10. The motor vehicle door of claim 9, wherein said adjustment mechanism includes a drag bar on said body and a drag on said cup holder whereby said cup holder may be secured in any of said multiple positions.

11. The motor vehicle door of claim 10, wherein said cup holder further includes an actuator for releasing said drag from said drag bar to displace said cup holder between said multiple positions.

12. The motor vehicle door of claim 11, wherein said cup holder further includes a spring for biasing said drag into engagement with said drag bar whereby said cup holder may be secured in any of said multiple positions.

* * * * *